United States Patent
Yiasoumi et al.

(10) Patent No.: US 9,425,600 B2
(45) Date of Patent: Aug. 23, 2016

(54) AIRCRAFT ELECTRICAL CABLE RACEWAY

(71) Applicant: AIRBUS OPERATIONS LIMITED, Bristol (GB)

(72) Inventors: Andreas Yiasoumi, Bristol (GB); Jack Blanchard, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 13/755,410

(22) Filed: Jan. 31, 2013

(65) Prior Publication Data
US 2013/0206926 A1    Aug. 15, 2013

(30) Foreign Application Priority Data
Jan. 31, 2012 (GB) .................................. 1201647.3

(51) Int. Cl.
*H02G 3/00* (2006.01)
*H02G 3/38* (2006.01)
*H02G 3/04* (2006.01)

(52) U.S. Cl.
CPC .............. *H02G 3/38* (2013.01); *H02G 3/0437* (2013.01)

(58) Field of Classification Search
CPC .... H02G 3/0437; H02G 3/38; H02G 3/0418; H02G 3/32
USPC ......... 248/49, 68.1, 55; 174/84.4, 68.3, 503, 174/507, 68.1, 99 R, 95, 97, 104
See application file for complete search history.

(56) References Cited

U.S. PATENT DOCUMENTS

| | | | |
|---|---|---|---|
| 1,786,425 A | 12/1930 | Christie | |
| 5,707,715 A | 1/1998 | DeRochemont et al. | |
| 6,037,068 A * | 3/2000 | de Rochemont | C23C 16/408 257/E39.018 |
| 6,147,015 A | 11/2000 | Bureau | |
| 6,521,835 B1 | 2/2003 | Walsh | |
| 2001/0017214 A1 | 8/2001 | Saeki et al. | |
| 2002/0036095 A1* | 3/2002 | Ewer | H02G 3/0418 174/97 |
| 2005/0121211 A1 | 6/2005 | Diggle, III et al. | |
| 2007/0044988 A1* | 3/2007 | VanderVelde | H02G 3/0418 174/72 A |
| 2008/0156529 A1 | 7/2008 | Charon et al. | |
| 2009/0191739 A1 | 7/2009 | Jur et al. | |
| 2010/0258686 A1* | 10/2010 | Sutton | H02G 3/0406 248/73 |
| 2011/0079429 A1 | 4/2011 | Ayme et al. | |
| 2011/0253696 A1* | 10/2011 | Hanagan | F23Q 7/22 219/260 |
| 2012/0205134 A1* | 8/2012 | Brasier | H02G 3/0443 174/68.3 |
| 2013/0075153 A1* | 3/2013 | Viviant | H02G 3/32 174/503 |

FOREIGN PATENT DOCUMENTS

| | | |
|---|---|---|
| AT | 329133 B | 4/1976 |
| DE | 19916263 A1 | 8/2000 |
| EP | 1414125 A1 | 4/2004 |
| GB | 2407439 A | 4/2005 |

(Continued)

OTHER PUBLICATIONS

Search Report corresponding to GB 1201647.3 dated May 29, 2012.

(Continued)

*Primary Examiner* — Todd M Epps

(74) *Attorney, Agent, or Firm* — Hauptman Ham, LLP

(57) ABSTRACT

An electrical cable raceway for an aircraft, the electrical cable raceway being formed at least in part from a ceramic material.

8 Claims, 2 Drawing Sheets

(56) References Cited

FOREIGN PATENT DOCUMENTS

WO      9322814 A1    11/1993
WO      9632161 A1    10/1996

OTHER PUBLICATIONS

Sugie Seito Co., et al., "Cera Duct", Oct. 1, 2010, [http://www.sugie.co.jp/top_img/sugie_catalogue_us.pdf], pp. 1-14.

G. SH. Mizheritskii, "Cable conduit System", The Great Soviet Encyclopedia, Jan. 1, 2010, [http:/encyclopedia2.thefreedictionary.com/Cable+Conduit+System].

European Application No. 13153003, Search Report dated Dec. 18, 2014.

EP Application No. 13153364.8, Search Report dated Nov. 26, 2014.

Search Report corresponding to GB 1201626.7 dated May 22, 2012.

* cited by examiner

AIRCRAFT ELECTRICAL CABLE RACEWAY

RELATED APPLICATIONS

The present application is based on, and claims priority from, British Application Number 1201647.3, filed Jan. 31, 2012, the disclosure of which is hereby incorporated by reference herein in its entirety.

The present invention relates to an electrical cable raceway for an aircraft.

Aircraft electrical cable raceways are typically made of aluminium and usually comprise several parallel elongate rigid channels in which the cables are retained and fastened. The raceway serves the purpose of guiding and securing the cables, protecting the cables from mechanical damage and shielding the cables from electro-magnetic hazards (EMH). Conventional aircraft electrical cable raceways are typically used for cables having a power rating below a certain value, typically for signal cables or low power applications. Cables carrying higher power are protected in different ways and are subject to more stringent requirements regarding segregation and separation of cables.

With the drive towards more electric aircraft, that is aircraft systems and controls being driven by electrically powered units, rather than for example hydraulic units, there is a greater demand for electrical power to be delivered all over the aircraft. In order to service this increased demand, whilst minimising the weight impact, the cables routed throughout aircraft need to support higher voltages and these cables generally experience greater extremes of temperature compared to low power cables. Further, the demand for space within aircraft structures, for example within the fixed leading edge of an aircraft wing, where raceways are commonly installed to deliver cables to various systems, is great and with the desire to optimise aerofoil shape, spatial efficiency is a constant design driver.

It is an object of the invention to provide an improved aircraft electrical cable raceway.

According to the invention there is provided an electrical cable raceway for an aircraft formed, at least in part, from a ceramic material.

In that way, the ceramic material can protect the raceway and other cables from higher temperatures which may be associated with high power cables.

The body of the raceway is preferably formed, at least in part, from a metallic material, most preferably aluminium. In a preferred arrangement, the body of the raceway comprises a metallic material frame and a ceramic material liner defining the pathway for electrical cables.

The ceramic material liner may be embedded within the metallic frame. Alternatively, the ceramic material may be applied as a layer on the metallic frame. In a further arrangement, the ceramic material may comprise an insert formed of ceramic material and received in the frame.

In a preferred embodiment, the electrical cable raceway comprises a body defining a plurality of separate cable pathways. In such an arrangement, one of the cable pathways may be formed at least in part from the ceramic material and another of the cable pathways may not include the ceramic material.

In a further preferred embodiment, the electrical cable raceway comprises a body made of ceramic material, to which a metallic spray is applied.

In yet a further preferred embodiment, the electrical cable raceway comprises a body made of metallic material, to which a ceramic spray is applied.

The ceramic material is preferably one selected from the group of alumina, silicon nitride and aluminium nitride.

DESCRIPTION OF SOME EXEMPLARY EMBODIMENTS

Figure 1:
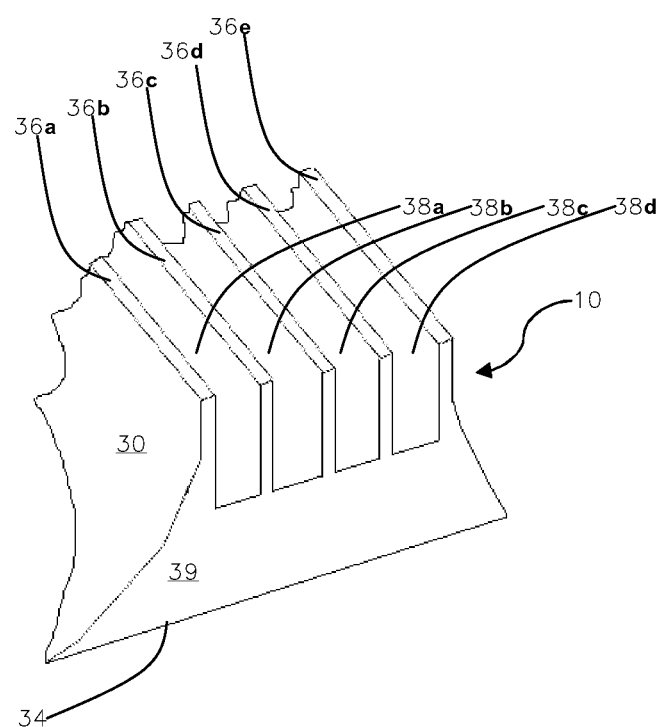
FIG. 1 shows a partial perspective view of a cable raceway in accordance with a first embodiment of the present invention.

In FIGS. 1 and 2, cable raceways 10, 110 have identical form and comprise elongate bodies 30, 130 having bases 34, 134 and five elongate, spaced apart, parallel walls 36a-e, 136a-e. The bases 34, 134 and walls 36a-e, 136a-e define four U-shaped channels 38a-d, 138a-d. The bodies 30, 130 of the cable raceways have first ends (not shown) and second ends 39, 139

The main body 30 of the cable raceway 10 is constructed in metal and ceramic, with the structure comprising a metallic frame into which a ceramic material liner has been embedded.

Although FIG. 1 describes cable raceway 10 as having ceramic material liner embedded within a metallic frame, the figure could equally apply to alternative embodiments of the present invention, such as the ceramic material layered onto the metallic frame, for example by processes such as electrophoretic deposition or deposition by sputtering. In yet another embodiment still represented by FIG. 1, the cable raceway 10 comprises a body made of ceramic material, to which a metallic spray is applied, to form an outer metallic coating.

Figure 2A:
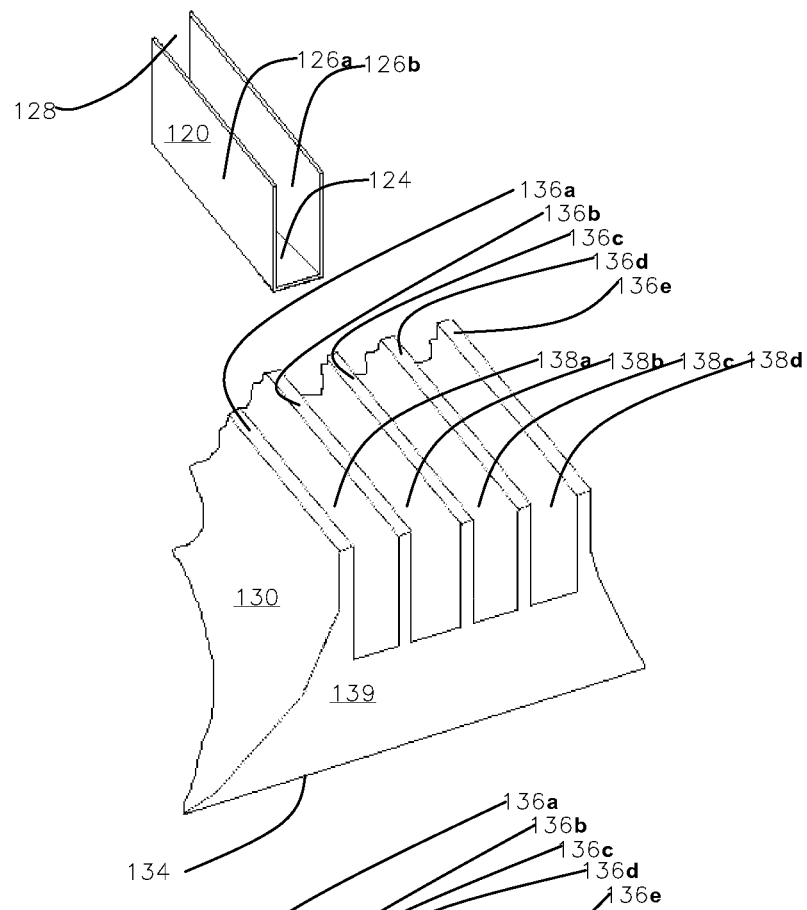
FIGS. 2A and 2B show partial perspective views of a cable raceway in accordance with a second embodiment of the present invention.

Unlike the main body 30 of cable raceway 10 in FIG. 1, the main body 130 of cable raceway 110 in FIG. 2a is made only of metal.

A U-shaped elongate insert 120 comprises a base 124 and two elongate, spaced apart, parallel walls 126a and 126b. The base 124 and walls 126a, b, define a U-shaped channel 128. The insert 120 is made from ceramic material.

Figure 2B:
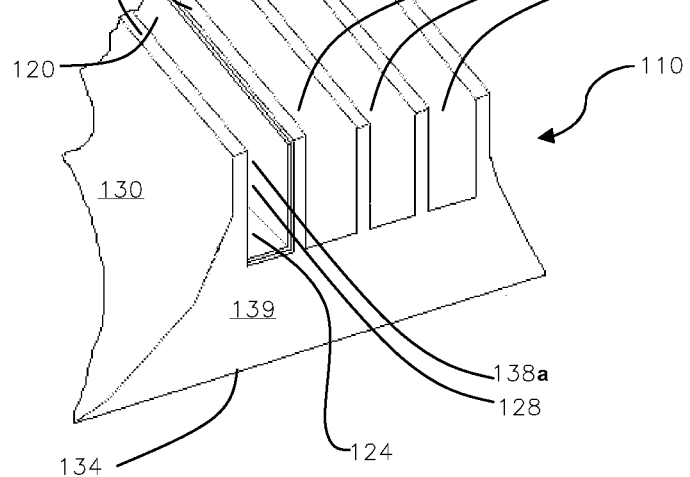

In FIG. 2b, the ceramic U-shaped elongate insert 120 is arranged to fit snugly inside the U-shaped channel 138a of the cable raceway 130, such that the wall 126a of the ceramic U-shaped elongate insert 120 is adjacent to the wall 136a of the cable raceway 130 and the wall 126b of the ceramic U-shaped elongate insert 120 is adjacent to the wall 136b of the cable raceway 130. The U-shaped channel 128 defined by the ceramic U-shaped elongate insert 120 provides a conduit for cables with ceramic shielding on three sides, differing from cables running within the conduits defined by channels 138b-d, which, not having ceramic U-shaped elongate inserts fitted, provide no ceramic shielding.

The invention claimed is:

1. An aircraft electrical cable raceway comprising a body defining a plurality of separate cable pathways, the pathways being formed, at least in part from a ceramic material, in which one of the cable pathways is formed at least in part from the ceramic material and another of the cable pathways does not include the ceramic material in which the body of the raceway comprises a metallic material frame and a U-shaped ceramic material liner, the ceramic material liner forming a layer corresponding to a U-shaped channel of the metallic material frame.

2. The aircraft cable raceway of claim 1, in which the body of the raceway comprises a metallic material frame and the ceramic material is applied as a layer on the metallic frame.

3. The aircraft cable raceway of claim 1, in which the body of the raceway comprises a metallic material frame and the ceramic material comprises an insert formed of ceramic material and received in the frame.

4. The aircraft cable raceway of claim 1, wherein the body is made of a ceramic material.

5. The aircraft cable raceway of claim 1, wherein the body is made of a metallic material, to which a ceramic spray is applied.

6. The aircraft cable raceway of claim 1, in which the ceramic material is one selected from the group of alumina, silicon nitride and aluminium nitride.

7. An aircraft cable raceway comprising a body defining a plurality of separate pathways, the body being formed, at least in part from a ceramic material, in which one of the cable pathways is formed at least in part from the ceramic material and another of the cable pathways does not include the ceramic material, in which the body of the raceway comprises a metallic material frame and a ceramic material insert, the ceramic material insert being received in and conforming to a shape of a channel defined by the metallic material frame.

8. An aircraft cable raceway comprising a body defining a plurality of separate pathways, the body being formed, at least in part from a ceramic material, in which one of the cable pathways is formed at least in part from the ceramic material and another of the cable pathways does not include the ceramic material, in which the body of the raceway comprises a metallic material frame and a ceramic material liner embedded within the metallic frame, the ceramic material liner defining the cable pathway formed at least in part from the ceramic material.

\* \* \* \* \*